(12) United States Patent
Berkoff

(10) Patent No.: US 8,892,695 B2
(45) Date of Patent: Nov. 18, 2014

(54) REMOTE INPUT DEVICES

(75) Inventor: Russell A. Berkoff, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 455 days.

(21) Appl. No.: 13/245,699

(22) Filed: Sep. 26, 2011

(65) Prior Publication Data

US 2013/0080646 A1 Mar. 28, 2013

(51) Int. Cl.
- *G06F 15/173* (2006.01)
- *H04L 12/28* (2006.01)
- *H04L 29/08* (2006.01)
- *H04L 29/06* (2006.01)

(52) U.S. Cl.
CPC ...... *H04L 12/2814* (2013.01); *H04L 29/08072* (2013.01); *H04L 29/06* (2013.01); *H04L 67/025* (2013.01)
USPC ............ 709/220; 709/224; 709/226; 713/151

(58) Field of Classification Search
CPC .......................... H04L 29/08072; H04L 29/06
USPC ............................. 709/220, 224, 228; 713/151
See application file for complete search history.

(56) References Cited

U.S. PATENT DOCUMENTS

| | | | |
|---|---|---|---|
| 8,151,280 B2 * | 4/2012 | Sather et al. | 719/321 |
| 8,249,076 B1 * | 8/2012 | Bertone et al. | 370/395.2 |
| 8,352,727 B2 * | 1/2013 | Chen et al. | 713/151 |
| 2003/0101294 A1 | 5/2003 | Saint-Hilaire et al. | |
| 2004/0090984 A1 | 5/2004 | Saint-Hilaire et al. | |
| 2005/0108369 A1 * | 5/2005 | Sather et al. | 709/220 |
| 2005/0246716 A1 * | 11/2005 | Smith et al. | 719/315 |
| 2006/0142991 A1 | 6/2006 | Sajwani et al. | |
| 2006/0282512 A1 | 12/2006 | Saint-Hilaire et al. | |
| 2006/0282513 A1 | 12/2006 | Saint-Hilaire et al. | |
| 2006/0282514 A1 | 12/2006 | Saint-Hilaire et al. | |
| 2008/0016255 A1 | 1/2008 | Saint-Hilaire et al. | |
| 2009/0319695 A1 | 12/2009 | Saint-Hilaire et al. | |
| 2010/0138649 A1 * | 6/2010 | Rossi et al. | 713/151 |
| 2014/0181893 A1 * | 6/2014 | Von Bokern et al. | 726/1 |

* cited by examiner

*Primary Examiner* — Khanh Dinh

(74) *Attorney, Agent, or Firm* — Kenneth L. Sherman, Esq.; Michael Zarrabian, Esq.; Sherman & Zarrabian LLP

(57) ABSTRACT

In a first embodiment of the present invention, a method for operating a user agent on a first device is provided, comprising: discovering, using a home networking protocol, a second device, wherein the second device includes a user input mechanism; retrieving information regarding the user input mechanism from the second device using the home networking protocol; determining whether to accept the connection based on the information regarding the user input mechanism; when it is determined to accept the connection, negotiating an out-of-band connection in a protocol other than the home networking protocol with the second device; receiving input command events from the second device via the out-of-band connection; and executing the input command events at the user agent to control an aspect of the first device.

20 Claims, 4 Drawing Sheets

REMOTE INPUT DEVICES

BACKGROUND OF THE INVENTION

1. Field of the Invention

The present invention relates generally to consumer electronic devices. More specifically, the present invention relates to using an input device to control a different device.

2. Description of the Related Art

Input devices, such as touchpads, mice, microphones, keyboards, etc. are typically either built into or directly connected to the devices they control (e.g., a tablet computer, mobile phone, or personal computer). The result is that the input device winds up being exclusively allocated to the particular device it is connected to. Recently, the popularity of device-capable wireless standards, such as Bluetooth®, has enabled an input device to be paired with a controlled device via a wireless connection. Nevertheless, the Bluetooth® device winds up being exclusively allocated to the controlled device, at least as long as the Bluetooth® pairing remains in effect. Pairing a Bluetooth® device with another Bluetooth® device requires that the user enter input on both devices to facilitate the pairing (on one of the devices a "Bluetooth® detection" mode must first be entered and then on the other device the user must select the particular device to connect to and/or enter an input code).

It would be beneficial, however, if there would be some way to dynamically allocate the input device to a device to be controlled. This is especially true in a home network, where a user may own many devices that have the capability to interact with one another. For example, a tablet computer may be configured to control a digital television, or voice analysis software on a mobile phone could be used to navigate menus on a digital television. This control could even operate in the other direction, with a user controlling a mobile device using, for example, a television.

Universal Plug and Play (UPnP) is a distributed, open networking architecture that allows devices to connect seamlessly and to simplify the implementation of networks in the home (data sharing, communications, and entertainment) and corporate environments. UPnP achieves this by defining and publishing UPnP device control protocols built upon open, Internet Engineering Task Force (IETF)-based communication standards.

UPnP has grown in popularity of late in part due to the rise in popularity of media servers. Media servers are small computers that store multiple types of content (e.g., photos, music, videos, etc.). The content may then be streamed from a media server to one or more control points (e.g., mp3 player, television set, etc.). These media servers have proven quite popular and have led the way towards more and more people establishing home networks of various types of devices in their homes and/or businesses.

UPnP communications, however, are not limited to media servers, and as the number of UPnP enabled devices in the home grows, there is more and more opportunity to allow different types of communications between the devices. While UPnP contains an ability to have one UPnP device send input commands to another device, it only does so by a guaranteed service wherein the controlling device keeps sending each input command to the controlled device over and over again until it is sure that the input command is received. In such instances, the repeated communications, possibly even unnecessary, can clog the communications stream. This slows the process down significantly, and in fact this UPnP-based input command transfer is too slow to perform the time-sensitive type of input command transfer that is needed in order to allow a user to, for example, control a menu on a television.

Users are used to having commands on many types of consumer devices, such as televisions, executed immediately upon pressing the button. The user experience would be severely degraded by using UPnP to communicate input commands, as what would ordinarily be a command that is executed immediately upon depressing a key could take as long as a few seconds, causing the user's next command to be entered prior to seeing any visual feedback from the first command, and thereby causing the user to get confused when entering a multi-command sequence. For example, a user may enter the commands to navigate "up", "left", and then "select" prior to even receiving any visual feedback that the "up" command has been executed (such as the cursor moving upwards on the screen). This may cause the user to assume that the "up" command was not even received, and thus he may enter it again, perhaps in the middle of an input sequence. This can wreak havoc on a sequence of commands to be entered by a user and contributes to a negative user experience with the device.

What is needed is a solution that addresses these issues

SUMMARY OF THE INVENTION

In a first embodiment of the present invention, a method for operating a user agent on a first device is provided, comprising: discovering, using a home networking protocol, a second device, wherein the second device includes a user input mechanism; retrieving information regarding the user input mechanism from the second device using the home networking protocol; determining whether to accept the connection based on the information regarding the user input mechanism; when it is determined to accept the connection, negotiating an out-of-band connection in a protocol other than the home networking protocol with the second device; receiving input command events from the second device via the out-of-band connection; and executing the input command events at the user agent to control an aspect of the first device.

In a second embodiment of the present invention, a first device is provided comprising: a processor; a home networking protocol interface; an out-of-band communications interface; a user agent designed to: discover, using a home networking protocol via the home networking protocol interface, a second device, wherein the second device includes a user input mechanism; retrieve information regarding the user input mechanism from the second device using the home networking protocol; determine whether to accept the connection based on the information regarding the user input mechanism, and when it is determined to accept the connection, sending a command to the out-of band interface to negotiate an out-of-band connection in a protocol other than the home networking protocol with the second device; receive input command events from the second device via the out-of-band communications interface; and execute the input command events to control an aspect of the first device.

In a third embodiment of the present invention, an apparatus is provided comprising: means for discovering, using a home networking protocol, a second device, wherein the second device includes a user input mechanism; means for retrieving information regarding the user input mechanism from the second device using the home networking protocol; means for determining whether to accept the connection based on the information regarding the user input mechanism; means for, when it is determined to accept the connection, negotiating an out-of-band connection in a protocol other than the home networking protocol with the second device; means for receiving input command events from the second device via the out-of-band connection; and means for executing the input command events at the user agent to control an aspect of the first device.

In a fourth embodiment of the present invention, a non-transitory program storage device readable by a machine tangibly embodying a program of instructions executable by the machine to perform a method for operating a user agent on a first device is provided, comprising: discovering, using a home networking protocol, a second device, wherein the second device includes a user input mechanism; retrieving information regarding the user input mechanism from the second device using the home networking protocol; determining whether to accept the connection based on the information regarding the user input mechanism; when it is determined to accept the connection, negotiating an out-of-band connection in a protocol other than the home networking protocol with the second device; receiving input command events from the second device via the out-of-band connection; and executing the input command events at the user agent to control an aspect of the first device.

DETAILED DESCRIPTION OF SPECIFIC EMBODIMENTS

Figure 1:
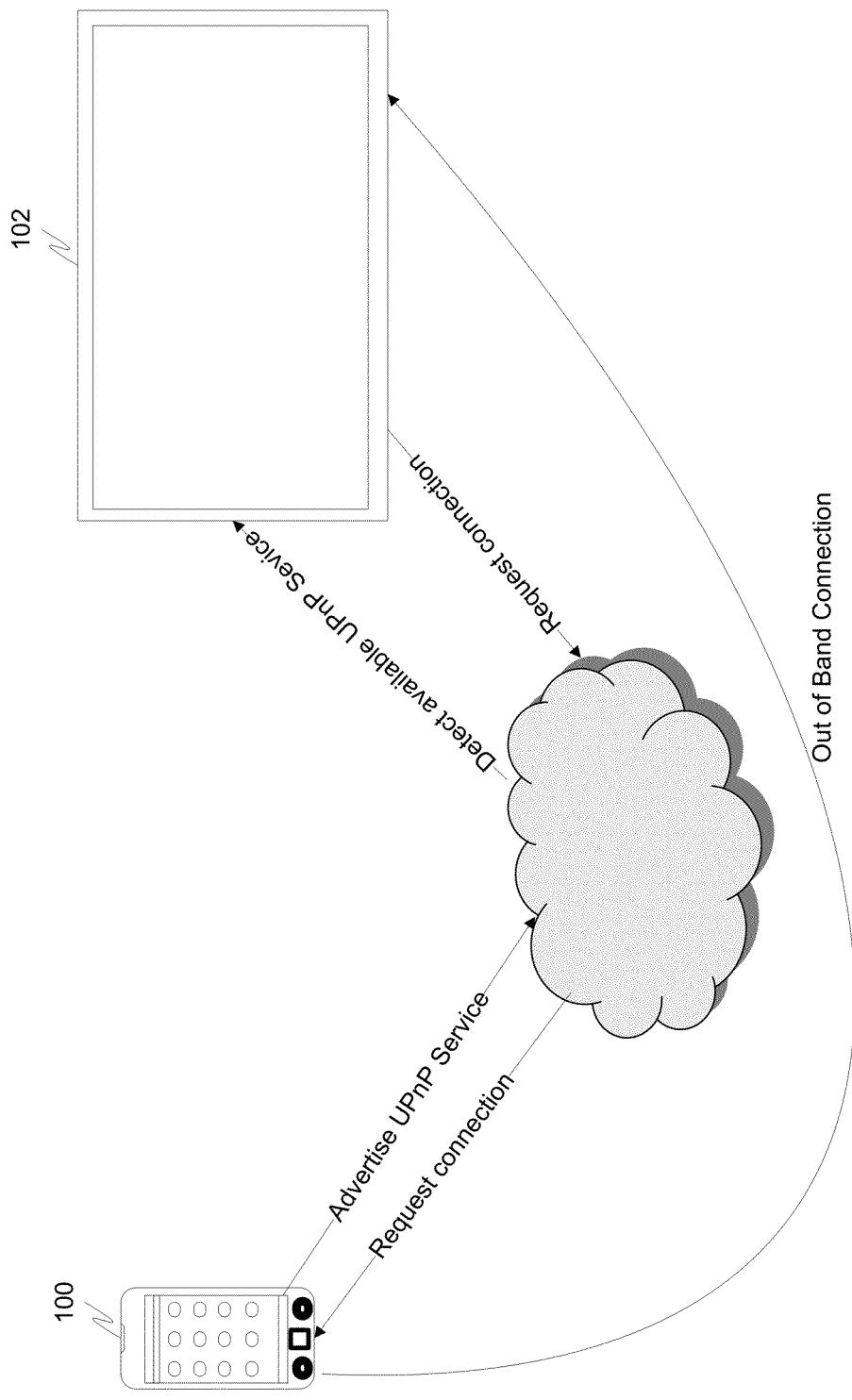
FIG. 1 is a block diagram illustrating a input device detection process in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

It should be noted that the term "home networking" as used throughout this document refers to a type of network that is commonly used in homes to connect media devices. There is no requirement, however, that this type of networking actually be used in homes, as it has equal applicability for use in businesses or other locations. As such, the term "home networking" shall not be construed as limiting any embodiments of the present invention to use in a home, and shall be interpreted as any type of local area network (LAN).

The present invention uses the UPnP protocol, but only for input device discovery. Rather than use UPnP's input command transfer protocols, which as described in the background section are too slow for adequate use, the present invention negotiates a separate, out of band, and more efficient connection between the system controlling the input device and the remote computing device.

UPnP allows for the dynamic advertisement and discovery of devices. A computing device can "offer" a remote input device by advertising a UPnP "service", which then negotiates the sharing of the remote device. UPnP devices can select from multiple different services, and in an embodiment of the present invention this can include UPnP services being offered by multiple different input devices (or even multiple input mechanisms on the same device). The actions defined by this service can allow the remote system to identify the characteristics of the remote device to other devices and define the criteria to allow sharing of the remote device and can allow the remote system to configure characteristics of the remote device (e.g., x/y maximum deflection, acceleration, voice command set, etc.)

Upon selection of a particular UPnP service by a device to be controlled, an out-of-band connection can then be negotiated. This out-of-band connection will ultimately be used to send the input events from the remote device to the device to be controlled.

The out of band connection that is ultimately negotiated can be in any non-UPnP protocol. Of course, it would be preferable if the non-UPnP protocol selected is one that is more efficient than UPnP's own input command transfer processes (perhaps by not being a protocol that guarantees the input commands). One example is using a User Datagram Protocol (UDP) socket. Other protocols are of course possible, such as Bluetooth® and Digital Enhanced Cordless Telecommunications (DECT).

Once an input device is discovered via UPnP protocols, information about the input device (via the UPnP service broadcast) can be provided to a user agent operating on the device to be controlled. One example of a user agent is a web browser. The web browser may include a specialized plug-in that allows it to receive the information regarding the discovered UPnP input device and establish the out of band communications channel for transmitting the user input commands. The web browser plug-in can provide an interface between the UPnP stack and the web browser. The plug-in then allows a web page to control and configure the input device. This is, of course, only one example of a user agent. In some embodiments the user agent may run independently of a web browser. In other embodiments, the user agent may be controlled by a web browser, but is not an actual plug-in for the web browser.

It should be noted that while an individual web page may have the power to control and configure the input device, this controlling and configuring could also be performed generically across all web pages by the user agent. For example, a web browser plug in on a television may automatically control and configure any mobile phones in the vicinity to act as a remote control for the user interface elements of the television, regardless of what web pages may be utilized on the television. Alternatively, one individual web page may automatically control and configure a mobile device in the vicinity to act as the interface whereas a different web page on the same browser elects not to control and configure the mobile device. By building the functionality into the user agent, the flexibility exists for device designers and web page designers to customize the experience as they wish.

FIG. 1 is a block diagram illustrating an input device detection process in accordance with an embodiment of the present invention. An input device 100 (here a mobile phone) first advertises on a UPnP network. A user agent on device 102 (here, a television) detects the available remote input device. A web page being run by the user agent then has the ability to accept or deny the connection. If the connection is accepted, then the user agent requests a connection to the remote input device 100. The remote input device 100 then also has the ability to accept or deny the connection. It should be noted that this acceptance or denial can be performed automatically on either-side of the transaction, making it transparent to the user. This can be accomplished using rules that are applied to automatically determine whether to accept or deny a connection. Alternatively, user input as to whether or not to accept the connection can be solicited. Once the connection is accepted on both sides, then the input device and the user agent negotiate an out of-band connection for the input device 100 events. At that point, input device events are transferred via the out-of-band connection as they occur on input device 100.

A proposed Javascript® input device control API is hereby provided. This API acts as a plug-in to a web browser compatible with Javascript®. It should be noted that this is merely an example, and is not intended to be limiting.

A non-visual scripting object can be provided within a web-page through the use of an <object>-element, with "application/remoteinput" as value for attribute "type". This object is used to allow the web-page to monitor/control remote-input devices.

<object id="RemoteInput" type="application/remoteinput"/>

The plug-in object is made accessible through the Document Object Model (DOM) with the interface defined as follows:

Properties:

function( ) onInputDeviceUpdate—read-write property that specifies the function that is called when an input device is either added or removed.

Methods:

DeviceHandle[ ] getInputDeviceHandles( )—Returns an array of available input device handles.

String getInputDeviceDescription(DeviceHandle devHandle)—Returns a displayable text string describing the input device.

String getInputDeviceType(DeviceHandle devHandle)—Returns the type of remote input device. Return values include:

Mouse
TouchPad
Keyboard
LaserMouse
WiiRemote
JoyStick
Command

Boolean setInputDeviceScale(DeviceHandle devHandle, Number maxX, Number maxY, Number maxZ)—Sets the maximum deflection for each axis.

Boolean setInputDeviceAcceleration(DeviceHandle devHandle, Number accelX, Number accelY, Number accelZ)—A value between 0-1 which sets the acceleration for each input device axis.

Boolean startInputDevice(DeviceHandle devHandle)—Starts accepting DOM input events from the indicated device handle.

Boolean stopInputDevice(DeviceHandle devHandle)—Stops accepting DOM input events from the indicated device handle.

Figure 2:
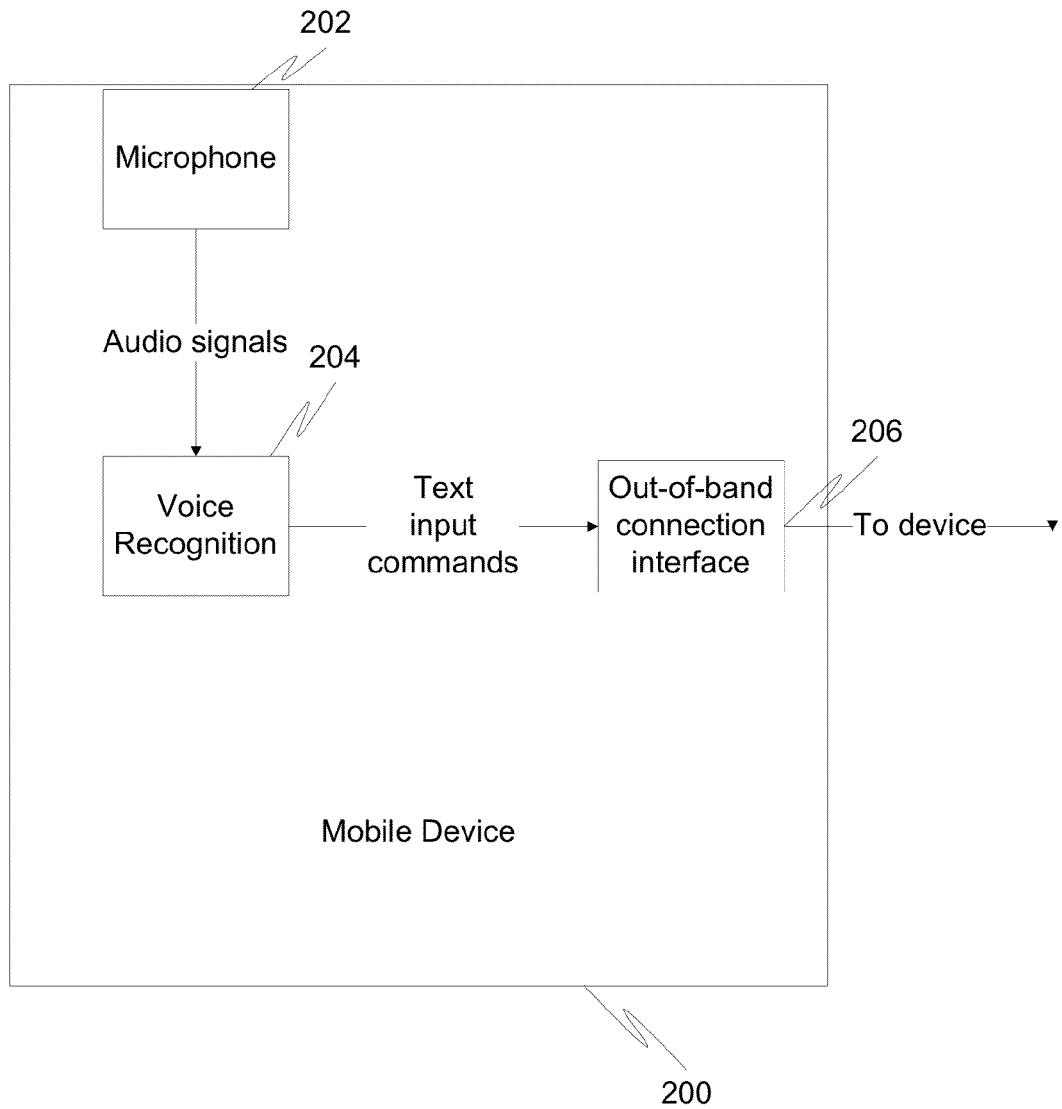
FIG. 2 is a block diagram illustrating an input translation mechanism in accordance with an embodiment of the present invention.

The present invention also allows the system to provide various input translation mechanisms on the more devices rather than utilize processing power and resources on the controlled device. For example, in the case of voice recognition from a microphone, the recognition processes can be performed on the input device rather than on the controlled device, and the voice translated to an input command prior to being sent over the out-of-band connection. FIG. 2 is a block diagram illustrating an input translation mechanism in accordance with an embodiment of the present invention. Here, a mobile device 200 includes a microphone 202 as well as a voice recognition module 204. The voice recognition module 204 translates audio signals from the microphone 202 into text input commands. This may be performed by comparing the audio to known audio snippets mapped to accepted text input commands. The text commands are then provided to an out-of-band connection interface 206, which sends them to a device, such as a television, for execution.

Figure 3:
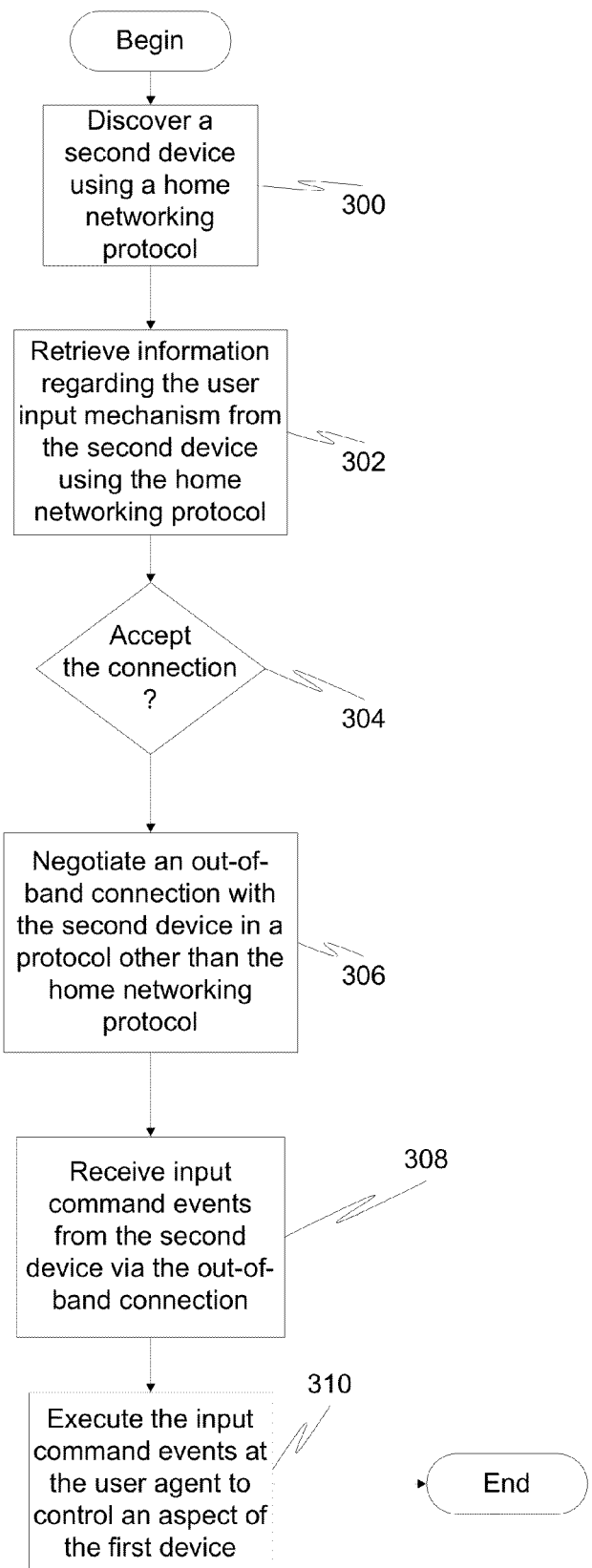
FIG. 3 is a flow diagram illustrating a method for operating a user agent on a first device in accordance with an embodiment of the present invention.

FIG. 3 is a flow diagram illustrating a method for operating a user agent on a first device in accordance with an embodiment of the present invention. The user agent can be, for example. a web browser plug-in. At 300, a second device is discovered using a home networking protocol. The second device includes a user input mechanism. At 302, information regarding the user input mechanism is retrieved from the second device using the home networking protocol. At 304, it is determined whether to accept the connection, based on the information regarding the user input mechanism. This determination may be performed by the web browser plug-in without regard for a web page being displayed by a corresponding web browser. Alternatively, it can be performed with regard for this web page. If it is determined to accept the connection, then at 306 an out-of-band connection is negotiated in a protocol other than the home networking protocol, with the second device. The out-of-band connection can be established using a UDP socket. At 308, input command events are received from the second device via the out-of-band connection. At 310, the input command events at the user agent are executed to control an aspect of the first device.

Figure 4:
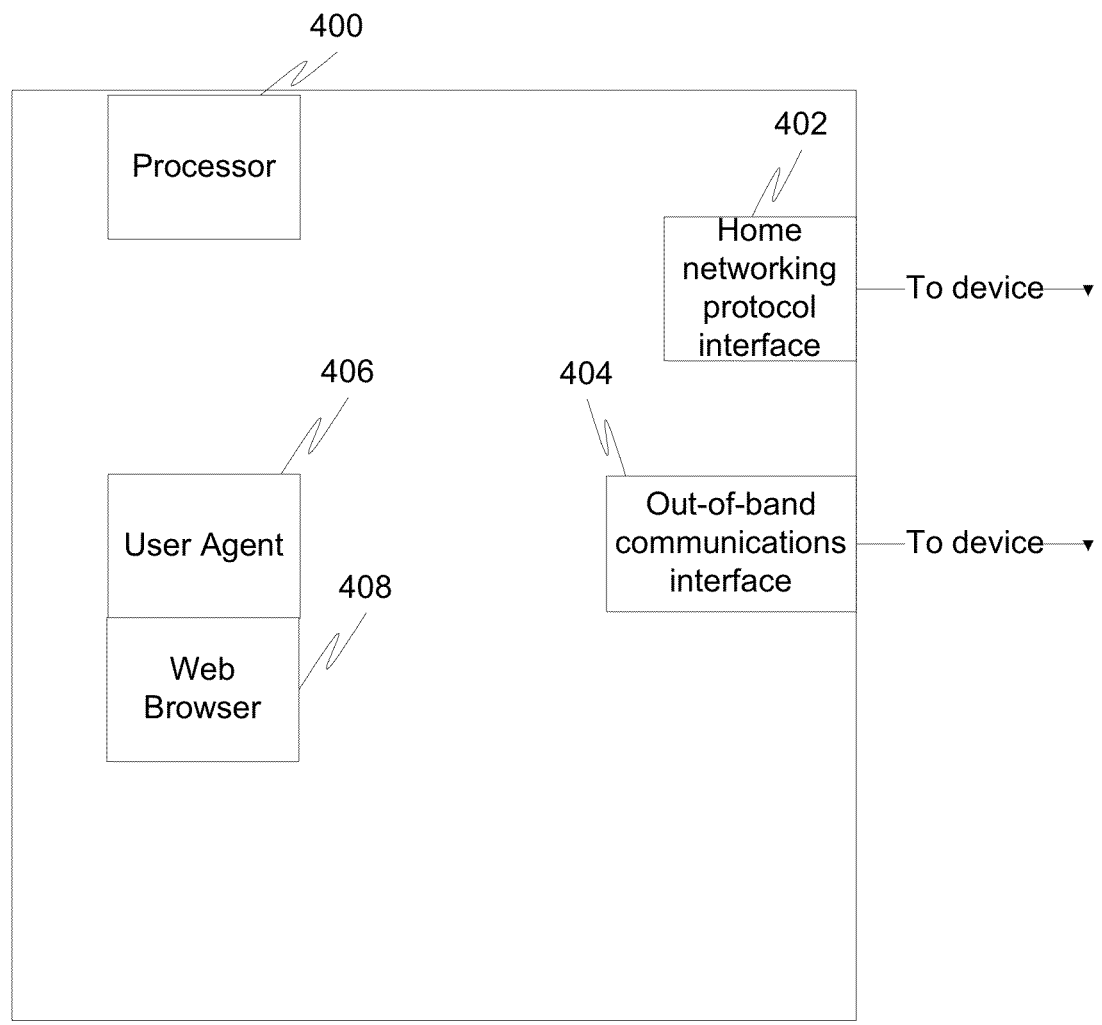
FIG. 4 is a block diagram illustrating a first device in accordance with an embodiment of the present invention.

FIG. 4 is a block diagram illustrating a first device in accordance with an embodiment of the present invention. A processor 400 may be provided to execute various software commands necessary to operate the present invention. A home networking protocol interface 402 may be designed to communicate with other devices via a home networking protocol. An out-of-band communications interface 404 may be designed to communicate with other devices via a protocol other than the home networking protocol.

A user agent 406 is provided as well. This user agent 406 may be, for example, a web browser plug in joined with web browser 408. The user agent may be designed to discover a second device, using the home networking protocol interface. The second device may include a user input mechanism. In one embodiment, the second device broadcasts the availability of the user input mechanism as a UPnP service, which the first device then discovers. The user agent is also designed to retrieve information regarding the user input mechanism from the second device using the home networking protocol, again using the home networking protocol interface 402.

The user agent is also designed to determine whether to accept the connection based on the information regarding the user input mechanism, and when it is determined to accept the connection, send a command to the out-of-band interface 404 to negotiate an out-of-band connection with the second device in a protocol other than the home networking protocol. The user agent is also designed to receive input command events from the second device via the out-of-band communications interface and then execute the input command events to control an aspect of the first device.

As will be appreciated to one of ordinary skill in the art, the aforementioned example architectures can be implemented in many ways, such as program instructions for execution by a processor, as software modules, microcode, as computer program product on computer readable media, as logic circuits, as application specific integrated circuits, as firmware, as consumer electronic device, etc. and may utilize wireless devices, wireless transmitters/receivers, and other portions of wireless networks. Furthermore, embodiment of the disclosed method and system for displaying multimedia content on multiple electronic display screens can take the form of an entirely hardware embodiment, an entirely software embodiment, or an embodiment containing both software and hardware elements.

The term "computer readable medium" is used generally to refer to media such as main memory, secondary memory, removable storage, hard disks, flash memory, disk drive memory, CD-ROM and other forms of persistent memory. It should be noted that program storage devices, as may be used to describe storage devices containing executable computer code for operating various methods of the present invention, shall not be construed to cover transitory subject matter, such as carrier waves or signals. Program storage devices and computer readable medium are terms used generally to refer to media such as main memory, secondary memory, removable storage disks, hard disk drives, and other tangible storage devices or components.

Although only a few embodiments of the invention have been described in detail, it should be appreciated that the invention may be implemented in many other forms without departing from the spirit or scope of the invention. Therefore, the present embodiments should be considered illustrative and not restrictive and the invention is not to be limited to the details given herein, but may be modified within the scope and equivalents of the appended claims.

What is claimed is:

1. A method for operating a user agent on a first device, comprising:
   discovering, using a first networking protocol, a second device, wherein the second device includes a user input mechanism;
   retrieving information regarding the user input mechanism from the second device using the first networking protocol;
   determining whether to accept a connection with the second device based on the information regarding the user input mechanism;
   in response to determining to accept a connection with the second device, negotiating an out-of-band connection with the second device in a protocol other than the first networking protocol;
   receiving one or more input command events from the second device via the out-of-band connection; and
   executing the one or more input command events at the user agent to control an aspect of the first device.

2. The method of claim 1, wherein the user agent is a web browser plug-in.

3. The method of claim 2, wherein the determining is performed by the web browser plug-in without regard for a web page being displayed by a corresponding web browser.

4. The method of claim 2, wherein the determining is performed by the web browser plug-in with reference to a web page being displayed by a corresponding web browser.

5. The method of claim 1, further comprising receiving an indication from the second device that the out-of-band connection has been accepted by the second device.

6. The method of claim 1, wherein the out-of-band connection is established using a User Datagram Protocol (UDP) socket.

7. The method of claim 1, wherein the first device is a television.

8. The method of claim 7, wherein the second device is a mobile phone.

9. The method of claim 7, wherein the second device is a tablet computer.

10. A first device comprising:
    a processor;
    a first networking protocol interface;
    an out-of-band communications interface; and
    a user agent designed to:
      discover, using a home networking protocol via the first networking protocol interface, a second device, wherein the second device includes a user input mechanism;
      retrieve information regarding the user input mechanism from the second device using the first networking protocol;
      determine whether to accept a connection with the second device based on the information regarding the user input mechanism, and in response to determining to accept a connection with the second device, sending a command to the out-of band interface to negotiate an out-of-band connection with the second device in a protocol other than the first networking protocol;
      receive one or more input command events from the second device via the out-of-band communications interface; and
      execute the one or more input command events to control an aspect of the first device.

11. The first device of claim 10, wherein the aspect being controlled is a mouse cursor.

12. The first device of claim 10, wherein the aspect being controlled is textual input.

13. The first device of claim 10, wherein the user agent is a web browser plug-in.

14. An apparatus comprising:
    means for discovering, using a first networking protocol, a second device, wherein the second device includes a user input mechanism;
    means for retrieving information regarding the user input mechanism from the second device using the first networking protocol;
    means for determining whether to accept a connection with the second device based on the information regarding the user input mechanism;
    means for, in response to determining to accept a connection with the second device, negotiating an out-of-band connection with the second device in a protocol other than the first networking protocol;

means for receiving one or more input command events from the second device via the out-of-band connection; and means for executing the one or more input command events at the user agent to control an aspect of the first device.

15. The apparatus of claim 14, wherein the second device includes a translation mechanism to translate input commands into a format readable by the first device.

16. A non-transitory program storage device readable by a machine tangibly embodying a program of instructions executable by the machine to perform a method for operating a user agent on a first device, comprising:

discovering, using a first networking protocol, a second device, wherein the second device includes a user input mechanism;

retrieving information regarding the user input mechanism from the second device using the first networking protocol;

determining whether to accept a connection with the second device based on the information regarding the user input mechanism;

in response to determining to accept a connection with the second device, negotiating an out-of-band connection with the second device in a protocol other than the first networking protocol;

receiving one or more input command events from the second device via the out-of-band connection; and executing the one or more input command events at the user agent to control an aspect of the first device.

17. The method of claim 1, wherein the second device includes a translation mechanism for translating input received via the user input mechanism of the second device into one or more input command events, wherein each input command event is in a format readable by the first device.

18. The method of claim 17, wherein:

the input received via the user input mechanism of the second device includes audio signals; and the translation mechanism of the second device translates the audio signals into text commands that are provided to the first device as input command events over the out-of-band connection.

19. The method of claim 17, wherein:

the user input mechanism of the second device includes a microphone; and the translation mechanism of the second device includes a voice recognition module.

20. The method of claim 1, wherein:

the first networking protocol is Universal Plug and Play (UPnP); and the out-of-band connection is in a non-UPnP protocol.

* * * * *